United States Patent [19]

Schwitters

[11] Patent Number: 4,691,507
[45] Date of Patent: * Sep. 8, 1987

[54] POLYURETHANE FLAIL FOR USE IN DEFOLIATING SUGAR BEETS AND THE LIKE

[75] Inventor: Wayne J. Schwitters, Clara City, Minn.

[73] Assignee: WIC, Inc., Shelly, Minn.

[*] Notice: The portion of the term of this patent subsequent to Sep. 8, 2004 has been disclaimed.

[21] Appl. No.: 773,121

[22] Filed: Oct. 15, 1985

[51] Int. Cl.⁴ ............................................. A01D 23/02
[52] U.S. Cl. ................................ 56/121.4; 56/121.43; 56/12.7; 56/504
[58] Field of Search ............. 56/12.7, 504, 505, 121.4, 56/121.41, 121.42, 121.43, 121.44, 121.45, 121.46, 505, 130, 16.5, 128, 330, DIG. 19; 171/20, 21, 22

[56] References Cited

U.S. PATENT DOCUMENTS

| 3,583,136 | 6/1971 | Eisenhardt | 56/121.43 |
| 4,077,193 | 3/1978 | Diggs | 56/330 |
| 4,291,524 | 9/1981 | Gates | 56/121.43 |
| 4,301,646 | 11/1981 | Gates et al. | 56/121.43 |

FOREIGN PATENT DOCUMENTS 1102510  7/1984  U.S.S.R. .............. 56/121.4

Primary Examiner—Gene Mancene
Assistant Examiner—John G. Weiss
Attorney, Agent, or Firm—Peterson, Wicks, Nemer & Kamrath

[57] ABSTRACT

The disclosed flexible flail is molded from polyurethane. The flail has a relatively thin shank with a hub at one end so that the flail can be attached to the rotor of conventional defoliating apparatus and has a thicker portion at the end thereof opposite the hub. A plurality of metal studs have disk-like heads embedded in the thicker portion of the shank and the studs project from the side of the shank opposite the thicker portion in a direction so as to strike the leaves and remove same from sugar beets and the like while such beets are still in the ground.

21 Claims, 3 Drawing Figures

POLYURETHANE FLAIL FOR USE IN DEFOLIATING SUGAR BEETS AND THE LIKE

CROSS-REFERENCE TO RELATED APPLICATION

My copending application titled "APPARATUS FOR DEFOLIATING SUGAR BEETS AND THE LIKE UTILIZING FLEXIBLE FLAILS WITH RIGID CUTTING MEMBERS AT THE FREE ENDS THEREOF", Ser. No. 745,191, filed on June 17, 1985, contains subject matter generally related to this application.

BACKGROUND OF THE INVENTION

1. Field of the Invention

This invention relates generally to defoliating apparatus for removing leaves from sugar beets and the like while the beets are still in the ground, and pertains more particularly to a flexible polyurethane flail having metal studs adjacent the free end thereof.

2. Description of the Prior Art

It is recognized that it is virtually mandatory to remove all of the leaves from sugar beets prior to lifting them from the ground. If the foliage is not removed, the leaves, when the beets are stored in piles, will continue to grow, causing loss of sugar content and undue spoilage; this is especially so when heat, moisture and/or wet soil are present.

Inasmuch as the problem has been in the past recognized, solid steel flails have been employed, the flails being pivotally mounted to a rotating drum. The height of the drum would be adjusted so that the steel flails would cut down the greens without cutting into those beets of normal height. However, in order to completely clean the remaining leaves not removed by the steel flails, two additional drums comprised of rubber flails have been used in combination with the steel flails, the rubber flails rotating in opposite directions with respect to each other. The salient shortcoming with such a prior art system has been that the beets themselves where they had grown abnormally high would be cut off at the level at which the machine is set and thus lost in that the portion thereof projecting above the ground to any degree would be completely severed. If not severed by the steel flails, those beets that have grown out of the ground to an appreciable degree would then be broken off by the trailing scalpers that have been required to clean those beets having foliage not fully removed by the tandemly oriented flails. The scalpers, it can be pointed out, would at times roll some of the beets completely out of the ground, and attributable to the fact that the scalper knives would become dull due to the fact that they would be dragged through the soil, breaking the backsides of an objectionable number of beets, removing portions from the ground and leaving portions in the ground.

Due to the troubles experienced from the combined use of both solid steel flails and flexible flails, as mentioned above, it has been commonplace to utilize an all rubber flail defoliator. Such defoliators include three drums with scalpers pulled therebehind. When using such an arrangement, the beets are no longer cut down to the extent that they would be when using steel flails plus trailing scalper blades. Whereas several tons of beets can be saved per acre when using all rubber flails, nonetheless, in some situations the beets would not be cleaned as well as they should be in order to avoid damage to the beets when piled for storage. Also, even though the rubber flails flex, they still can roll the beets right out of the ground because they do not bend or bow sufficiently. Their thickness of ¾ inch prevents sufficient bending. Rubber flails can also scrape away part of the beet by not bending or bowing enough.

Even at relatively low rotor speeds on the order of 400 RPM rubber flails fail at an unacceptable rate. One hundred percent (100%) rubber flail failures in one year have been known to occur. Rotation speeds of 600 RPM are virtually prohibited because such speeds are dramatically more destructive where rubber flails are employed.

Furthermore, even before the beets are lifted from the ground, during cold harvesting periods, the leaves can freeze so that they cannot be effectively removed, even when going to the trouble and expense of retopping the leaves. Consequently, when beets with leaves remaining thereon enter the lifter of the harvester, plugging results. In other words, the beets, when still having leaves thereon, simply will not pass through the harvesting machine.

Still further, people have been injured trying to clean the lifters when clogged, so sugar beet farmers have been compelled to set the scalpers quite deep in an attempt to obviate the plugging difficulties. However, this results in many tons of beets being unnecessarily cut and the processable amount that can be salvaged reduced appreciably.

Hence, there has been a constant effort to derive both a better product and a greater amount of such product. Any improvement helps the farmer get more beets per acre and also enables him to deliver a better product to the sugar mill.

Because steel flails have caused so much trouble in the past, they have become virtually obsolete. However, the use of rubber flails is quite widespread and an example of defoliating apparatus making use of such flails is illustated in U.S. Pat. No. 4,291,524, granted Sept. 29, 1981 to Donald C. Gates. Even though the apparatus described in the alluded to patent makes an effort to reduce the difficulties stemming from the use of flexible flails, doing so by means of a plurality of flexible fingers or projections integral with the rubber flail. The problem of completely, or even substantially doing so, as far as removing leaves from beets before they are lifted from the ground is not fully solved. Some of the still existing difficulties have been alluded to herein.

SUMMARY OF THE INVENTION

An important object of my invention is to provide a flexible flail of polyurethane for sugar beets and the like that will provide a more complete removal of the leaves from the beets while still in the ground, doing so more effectively than just rubber flails per se, and also avoiding the loss and damage to sugar beets resulting from the previously used combination of steel flails and rubber flails. Stated somewhat differently, an aim of my invention is to provide apparatus for defoliating sugar beets and the like which will simulate the action of steel flails without the attendant disadvantages thereof and which apparatus will perform considerably better than commonly used flexible flails of rubber.

Another object of the invention is to greatly minimize the need for scalpers, together with the time-consuming task of having to sharpen the blades thereof.

The invention also has for an object the elimination of one of the conventionally employed three rotors on which the flails are pivotally mounted, the reduction to two rotors effecting a substantial monetary saving which is possible when practicing my invention. This is achieved by being able to rotate the rotors at higher speeds, typically, increasing the revolutions per minute from 400 to 600 and at the same time decrease the rate of flail failure. At faster speeds, each flail gets more "bites" at the leaves—actually 50% more when increasing from 400 RPM to 600 RPM.

Another object of the invention is to impart sufficient rigidity to the free ends of flexible flails so that they literally peel the leaves from sugar beets before the beets are removed from the soil in which they have grown, thereby avoiding the foliage problems that have plagued sugar beet farmers for many years. In this regard, an aim of my invention is to provide a number of cutting or scraping studs at the free end or tip of each flexible flail where they will be most efficient as far as severing the beet leaves.

Another object of the invention is to provide a means for improving the action of flexible flails at little expense to the farmer. In this regard, it is planned that the flails be inexpensively equipped with my invention at the time the flails are manufactured. More specifically, an aim of the invention is to provide a number of tungsten carbide studs that have their flat heads anchored within the polyurethane, the studs projecting from the approach side of the flail when in use so as to effectively remove virtually all of the greens from sugar beets while still in the ground.

My invention has for another object the provision of a much lighter weight flail. In this regard my polyurethane flail will weigh on the order of only five ounces whereas a rubber flail of corresponding size will weigh approximately eleven ounces. Although the material costs per polyurethane flail versus a conventional rubber flail are not significantly different, the longer lasting capability of my polyurethane flail makes my flail considerably less costly. In addition, less damage is inflicted on the beets, being partly attributable to the fact that there is less mass and less of a "hammer blow" effect.

Still another object of my invention, which is very important, is to utilize a polyurethane flexible flail, the polyurethane having exceptional resistance to abrasion, to being cut, or to being torn. Also, such material serves as a good anchoring medium for the metal studs contributing to an effective leaf removal.

Briefly, my invention contemplates the use of a flexible polyurethane flail having a plurality of metal studs at the free end or tip thereof that will effectively cut off and remove leaves from sugar beets and the like while the beets are still in the field. In this respect, the invention possesses the advantages of both steel and rubber flails, the invention offering a decided improvement over either of these two flail types when considered individually or collectively.

DESCRIPTION OF THE PREFERRED EMBODIMENT

Figure 1:
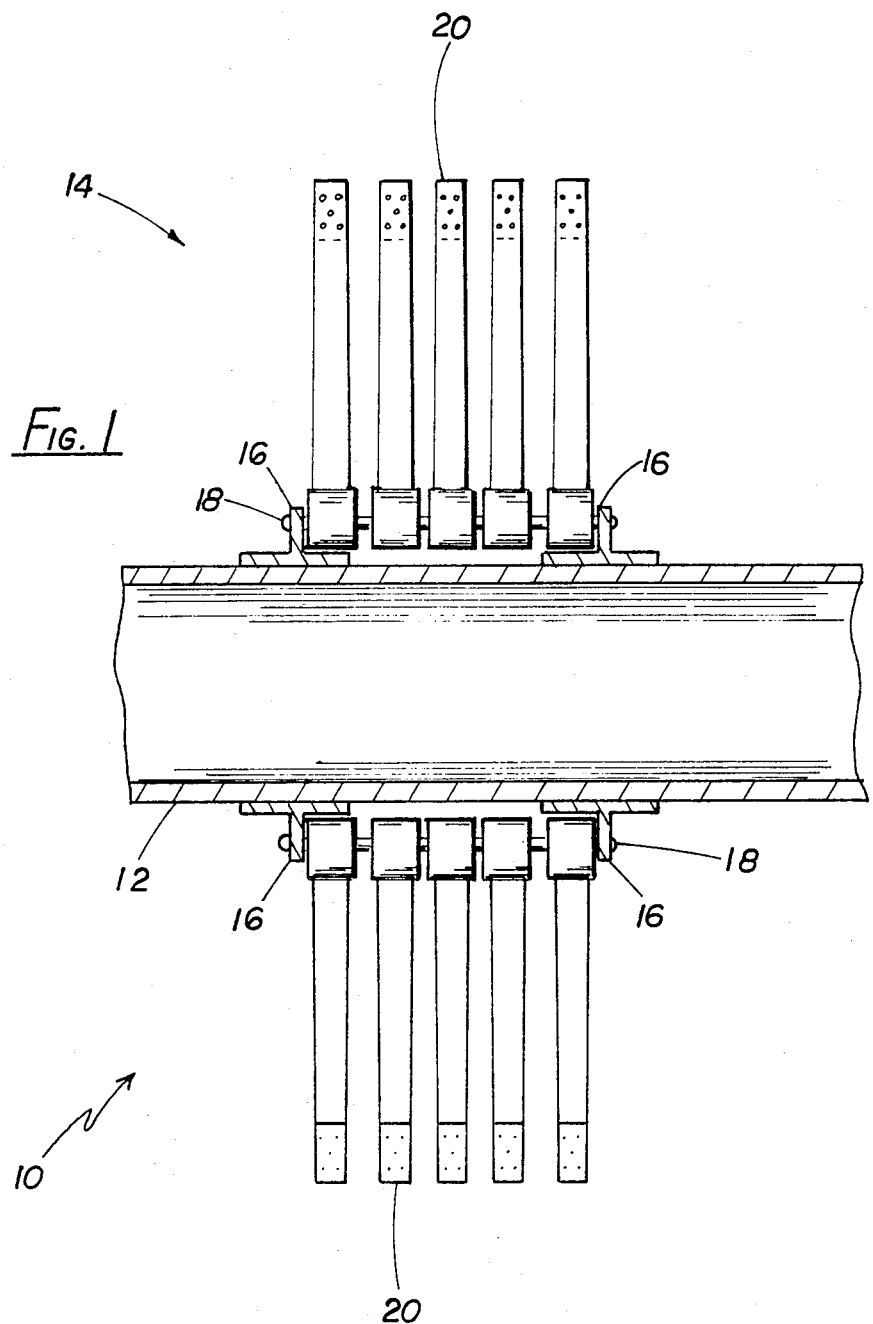
FIG. 1 is an elevational view of one of the groups of flails on a rotor of a conventional defoliator.
Figure 2:
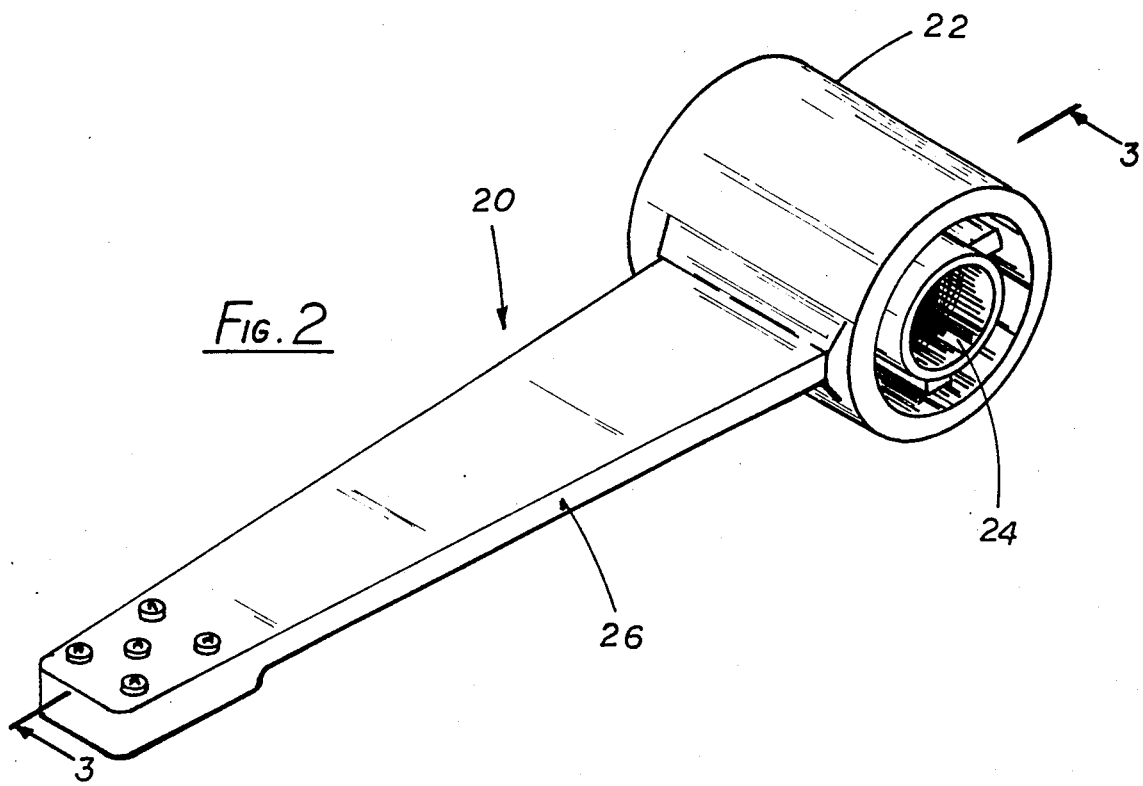
FIG. 2 is a perspective view of one of the tapered flails appearing in FIG. 1 with five metal studs projecting from one side thereof.

In the usual defoliator, such as that illustrated in said U.S. Pat. No. 4,291,524, in order to progressively remove the tops or foliage from the sugar beets, three tandemly oriented rotors are employed. Reference, if need be, can be made to this patent for additional information. It has already been explained that my invention permits one such rotor to be eliminated, enabling only two to be employed in most instances. Also, the need for scalpers is for all intents and purposes obviated. From FIG. 1, where a portion of one such rotor has been depicted, it will be discerned that the rotor, which has been denoted generally by the reference numeral 10, includes a cylindrical drum 12, the ends of the cylindrical drum 12 being journaled for rotation in side plate members (not shown) belonging to the defoliating apparatus, such as shown in U.S. Pat. No. 4,291,524. It should be pointed out that the rotor is frequently referred to as a "drum".

While the rotor 10, in practice would have six individual groups of flails or units mounted thereon, only one such group or unit appears in FIG. 1, being labeled 14. From FIG. 1 it will be perceived that the flail group or unit 14 thereappearing includes semicircular plates 16, there being two such plates 16 at each end of the flail group or unit 14. The semicircular plates 16 are conventionally clamped to the cylindrical drum 12 by means of clamping bolts (not shown). Each semicircular plate 16 has a plurality of rods 18 extending therebetween, the ends of the rods 18 being fixedly anchored to the semicircular plates 16.

Pivotally carried on each of the various rods 18 are five individual flails labeled 20. The flails 20 are of substantially all polyurethane, although minor amounts of other materials may be included with the polyurethane, such as nylon (on the order of 5%) and thermoplastic rubber (also on the order of 5%). Nylon, for example, can enhance the wear characteristics, whereas the rubber can increase the elasticity.

As can be understood from FIG. 1, the flails 20 are tapered. More specifically, the free end or tip of the tapered flails 20 is on the order of one inch.

With reference to each flail 20, it will be perceived that it possesses a hub or sleeve 22 having a bore 24 extending therethrough, the bore 24 receiving therein a portion of the rod 18 that provides the pivotal mounting therefor. The flail 20, which has an overall length of 12 inches, has a shank 26 nine and one-half inches long that tapers from approximately one and one-half inches adjacent the hub 22 to one inch at its free end or tip, thereby enabling it to be more readily deflected to one side of the beets being detopped. The shank 26, as illustrated, is of uniform thickness throughout its length, namely, a thickness of only 0.25 inch, whereas a rubber flail would have a thickness of 0.75 inch which thickness detracts from the rubber flail's capability to bend or bow as it passes over sugar beets still in the ground.

In order to realize fully the benefits of my invention, the free ends of each flail 20 is provided with a number of metal studs 30, more specifically, tungsten carbide and each having a cylindrical body 32, a small tip 34 thereon, and a disk-like flat head 36. The head 36 is embedded in a thickened end portion 38 formed on the shank 30. Whereas the shank 26, as previously indicated, possesses the 0.25 inch thickness the thickened portion 38, approximately 1.5 inches in length, has a thickness of 0.375 inch (0.125 inch thicker than the 0.25 inch thickness of the main portion of the shank 26).

While the studs 30 are capable of withstanding the abrasive action of the soil, and that of other debris, as they pass thereover, and at times therethrough, it is also important to appreciate that the material in which the studs are anchored should withstand abrasion and not resist tearing, yet be sufficiently flexible so as to be deflected over the curved surfaces of the upper ends of the beets. Possessing admirable properties in this regard is polyurethane and it is planned that the flails 20 be fabricated from this type of material, possibly modified by the minor amounts of nylon and rubber, as previously mentioned.

The fabrication of my flail 20 is relatively simple, lending itself readily to injection molding. The two die halves of the mold (not shown) have cavities that provide one-half the thickness of the shank 26 and one-half the diameter of the hub 22. The die half that forms the thickened end portion 38, of course, has a deeper cavity portion at that end. The thickened end portion 38 is quite important in providing sufficient polyurethane so that the studs 30 are securely anchored. Also, the end portion 38 recieves the greatest impact as the projecting studs 30 strike the beet leaves to the defoliating process, so the thickened portion 38 reinforces the flail 20 in the very region where needed.

Figure 3:
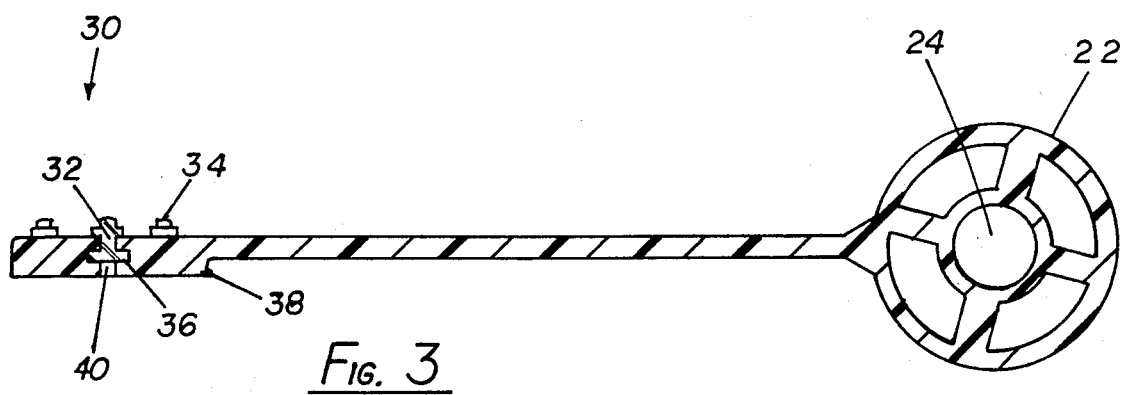
FIG. 3 is a sectional view taken in the direction of line 3—3 of FIG. 2 for the purpose of better depicting how the head of one stud is embedded in the flail.

The longitudinal section appearing in FIG. 3 depicts a hole 40. Obviously, there is a hole 40 associated with each stud 30 (see FIG. 1). The die half that forms the thickened end portion 38 has a pin for each stud 30 that holds its stud 30 in a raised position so that the molter plastic will flow beneath annular portions of the heads 36. These pins form the holes 40.

Recapitulating, it should be borne in mind that my flail 20 is exceedingly wear resistant, longer lasting, and more effective, both because it can be rotated at higher revolutions per minute and because it can employ metal studs. Consequently, my invention enables sugar beets in particular to be economically defoliated, sufficiently so that heretofore experienced problems with the storage and sugar mill processing thereof will not be adversely affected.

I claim:

1. A flexible flail for use in defoliating sugar beets and the like comprising a relatively flexible polyurethane shank, a polyurethane hub integral with one end of said shank for attachment to a rotor of defoliating apparatus, and a plurality of metal relatively rigid studs projecting from one side of said shank adjacent the other end thereof.

2. A flexible flail in accordance with claim 1 in which said studs are of tungsten carbide.

3. A flexible flail in accordance with claim 1 in which one end of said studs are embedded in the polyurethane shank.

4. A flexible flail in accordance with claim 3 in which said embedded ends of the studs each have a head thereon.

5. A flexible flail in accordance with claim 4 in which said studs each have a generally cylindrical body and said heads constitute circular disks extending radially outwardly from said body.

6. A flexible flail in accordance with claim 5 in which the projecting ends of said studs have a tip thereon, the tip in each instance being of smaller diameter than that of the cylindrical body with which they are associated.

7. A flexible flail in accordance with claim 1 in which said shank has a relatively thick portion adjacent said other end.

8. A flexible flail in accordance with claim 7 in which each said studs has a head thereon, the head in each instance being embedded in the relatively thick portion of said shank.

9. A flexible flail in accordance with claim 8 in which said relatively thin shank is of uniform thinness between said hub and said relatively thick portion.

10. A flexible flail in accordance with claim 9 in which the uniform thinness of said shank is on the order of 0.25 inch.

11. A flexible flail in accordance with claim 10 in which the width of said shank tapers from said hub to said relatively thick portion.

12. A flexible flail in accordance with claim 11 in which said relatively thick portion has a thickness on the order of 0.375 inch.

13. A flexible flail for use in defoliating sugar beets and the like comprising a relatively thin polyurethane shank, a polyurethane hub integral with one end of said shank for attachment to a rotor of defoliating apparatus, said shank having a relatively thick portion adjacent the other end thereof.

14. A flexible flail in accordance with claim 13 in which said relatively thick portion is 50% thicker than said shank and projects in one direction from said shank.

15. A flexible flail in accordance with claim 14 including a plurality of metal studs, each stud having a head embedded in said relatively thick portion and projecting generally perpendicularly from the side of said shank opposite the side from which said relatively thick portion projects.

16. A flexible flail in accordance with claim 15 in which said relatively thick portion encircles an annular portion of each of said heads.

17. A flexible flail for use in defoliating sugar beets and the like comprising a relatively thin flexible shank of substantially all polyurethane with minor amounts of nylon and thermoplastic rubber, a hub integral with one end of said shank for attachment to a rotor of defoliating apparatus, said shank having a relatively thick portion adjacent the other end thereof, and a plurality of metal studs having heads embedded in said relatively thick portion and projecting generally perpendicularly from the side of said shank opposite the side from which said relatively thick portion projects.

18. A flexible flail in accordance with claim 17 in which said shank has a relatively thick portion adjacent the other end thereof, and a plurality of metal studs having heads embedded in said relatively thick portion and projecting generally perpendicularly from the side of said shank opposite the side from which said relatively thick portion projects.

19. A flexible flail for use in defoliating sugar beets and the like comprising a relatively flexible polyurethane shank of uniform thickness having an enlarged integral hub at one end thereof for attaching to a rotor of a defoliating apparatus, and a plurality of relatively rigid studs of metal projecting from one side of said shank adjacent the other end thereof.

20. A flexible flail in accordance with claim 19 in which each of said studs has a head thereon having oppositely facing first and second sides, said head residing within said shank at locations approximately midway between said one side and the opposite side of said shank so that portions of said shank extend between the first side of said heads and said one side of said shank and between the second side of said heads and the other side of said shank.

21. A flexible flail in accordance with claim 20 in which said elastomeric material is polyurethane and said studs are tungsten carbide.

* * * * *